United States Patent [19]

Kahn

[11] Patent Number: 4,752,961
[45] Date of Patent: Jun. 21, 1988

[54] MICROPHONE ARRANGEMENT

[75] Inventor: David A. Kahn, Nepean, Canada

[73] Assignee: Northern Telecom Limited, Montreal, Canada

[21] Appl. No.: 778,954

[22] Filed: Sep. 23, 1985

[51] Int. Cl.$^4$ .......................... H04R 1/08; H04R 1/32
[52] U.S. Cl. ...................................... 381/92; 379/387;
379/419; 381/157; 381/168; 381/169
[58] Field of Search ................... 179/100 R, 102, 103,
179/121 R, 121 D; 381/92, 98, 122, 155, 157,
168, 169, 182, 387; 379/419, 433, 435, 436, 428

[56] References Cited

U.S. PATENT DOCUMENTS

| | | | |
|---|---|---|---|
| 4,316,058 | 2/1982 | Christensen | 381/20 |
| 4,495,643 | 1/1985 | Orban | 381/106 |
| 4,536,887 | 8/1985 | Kaneda et al. | 381/92 |

FOREIGN PATENT DOCUMENTS

| | | | |
|---|---|---|---|
| 59-171297 | 9/1984 | Japan | 381/92 |
| 60-90499 | 5/1985 | Japan | 381/92 |

Primary Examiner—Jin F. Ng
Assistant Examiner—Danita R. Byrd
Attorney, Agent, or Firm—Thomas Adams

[57] ABSTRACT

A microphone arrangement, suitable for a telephone handset, comprises an array of microphone transducers, conveniently pressure transducers arranged at the vertices of a cube. Signal processing circuitry derives from the transducer outputs signals representing the magnitude and direction of the pressure gradient of the sound field at the array. In response to these signals, the microphone transducer outputs are weighted so as to direct the directional sensitivity lobe of the microphone towards the source of the maximum sound detected thereby.

8 Claims, 2 Drawing Sheets

MICROPHONE ARRANGEMENT

BACKGROUND OF THE INVENTION

The invention relates to microphone arrangements, especially, but not exclusively, for telephones.

There is increasing concern that, in telephony, the replacement of analogue switches by digital switches and the replacement of non-linear carbon microphones by linear microphones have resulted in a degradation in service quality. This is believed to be due to the lack of background noise suppression by the recently-adopted linear microphones. This increased noise creates listening problems not only at the far end but also at the near end, where the sidetone suppression is degraded by the poor impedance matching of digital switches.

It has been proposed to use a pressure gradient type of linear microphone to improve background noise suppression because it discriminates in favour of sounds originating close by. In particular, its response is proportional to the inverse square of the distance of the source. However, such a microphone is not entirely satisfactory for a telephone handset because it is very directive. A user would have to orient the handset carefully to avoid nulls or low sensitivity.

An object of the present invention is to mitigate this problem.

SUMMARY OF THE INVENTION

According to the present invention there is provided a telephone microphone comprising:

(i) an array of microphone transducers;

(ii) signal generating means responsive to the respective outputs of said transducers for generating a signal representing the magnitude and direction of the pressure gradient of the sound field at the array; and (iii) weighting means responsive to said signal for weighting the outputs of said microphone transducers to adjust the orientation of the directional lobe or axis of maximum sensitivity of the microphone towards the direction of the maximum sound detected thereby.

The microphone may also comprise means responsive to the signal generating means for deriving the direction of the pressure gradient vector.

BRIEF DESCRIPTION OF THE DRAWINGS

An embodiment of the invention will now be described by way of example only and with reference to the accompanying drawings, in which.

DETAILED DESCRIPTION OF A PREFERRED EMBODIMENT

Figure 1:
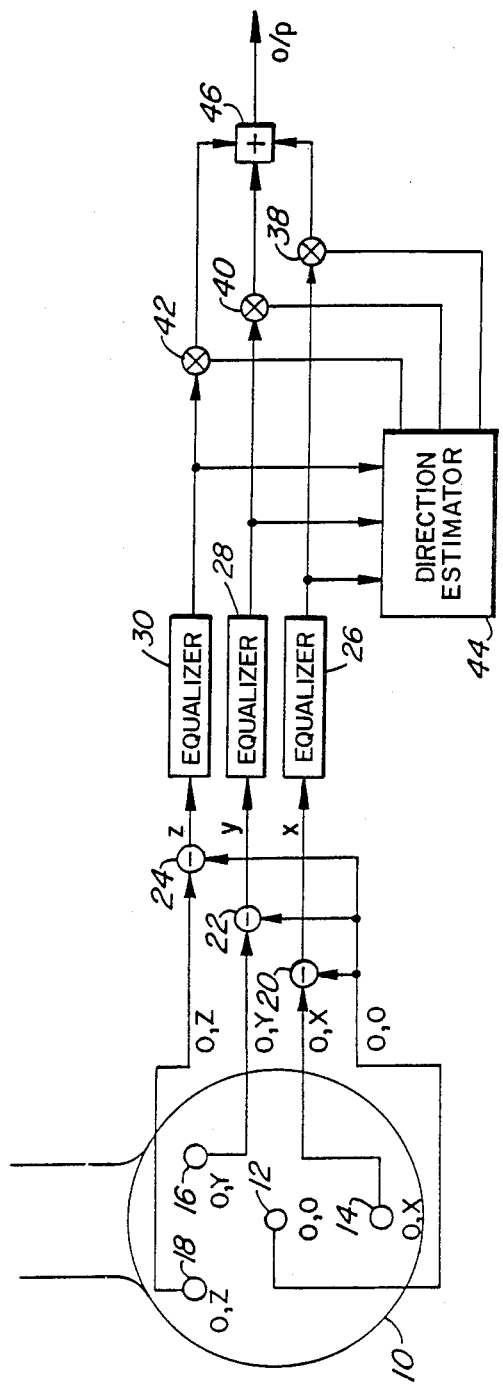
FIG. 1 is a schematic representation of a part of a telephone handset and its associated circuitry.
Figure 2:
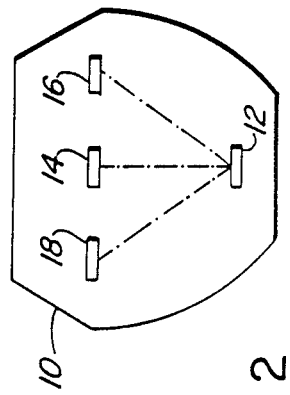
FIG. 2 illustrates a sectional end view of the mouthpiece.

In FIGS. 1 and 2, the mouthpiece part of a telephone handset is shown at 10. Four scalar pressure microphones 12, 14, 16 and 18 are mounted inside the mouthpiece. The microphones 12, 14, 16 and 18 are arranged in a cube, each at a corresponding one of the cube vertices. Microphone 12 is in the base of the mouthpiece 10 and thus further away from the voice source than the plane through the other three microphones.

The outputs of microphones 14, 16 and 18 are applied to subtractors 20, 22 and 24, respectively (FIG. 1). The output of microphone 12 is also applied to the subtractors 20, 22 and 24, where it is subtracted from the outputs of the other three microphones 14, 16 and 18. The outputs of the subtractors 20, 22 and 24 thus represent three orthogonal vectors x, y, z which completely describe the sound field gradient at the array. The outputs x, y, z from the subtractors 20, 22 and 24 are applied to equalizers 26, 28, 30, respectively, and equalized because the gradient microphone response is proportional to frequency and also to define the speech channel bandwidth.

The three signals from equalizers 26, 28 and 30 are applied to multipliers 38, 40 and 42 and also to direction estimator 44. In direction estimator 44 the magnitude of the pressure gradient is derived by taking the square root of the sum of the squares of the three constituent vectors x, y, z. The direction of the pressure gradient vector is then estimated using three-dimensional trigonometry. This is normally defined in terms of three direction cosines. Assuming that the telephone user's voice is the dominant part of the field, the direction cosines, averaged over a short time, for example 200 milliseconds, will relate to the location of that voice.

The outputs of the direction estimator 44 are applied to multipliers 38, 40 and 42 and multiplied by the corresponding ones of the constituent vectors x, y, z, effectively weighting them. The products at the outputs of the multipliers 38, 40 and 42 are then summed by summer 46 to give an output which simulates a single pressure gradient microphone pointing directly at the voice source.

Figure 3:
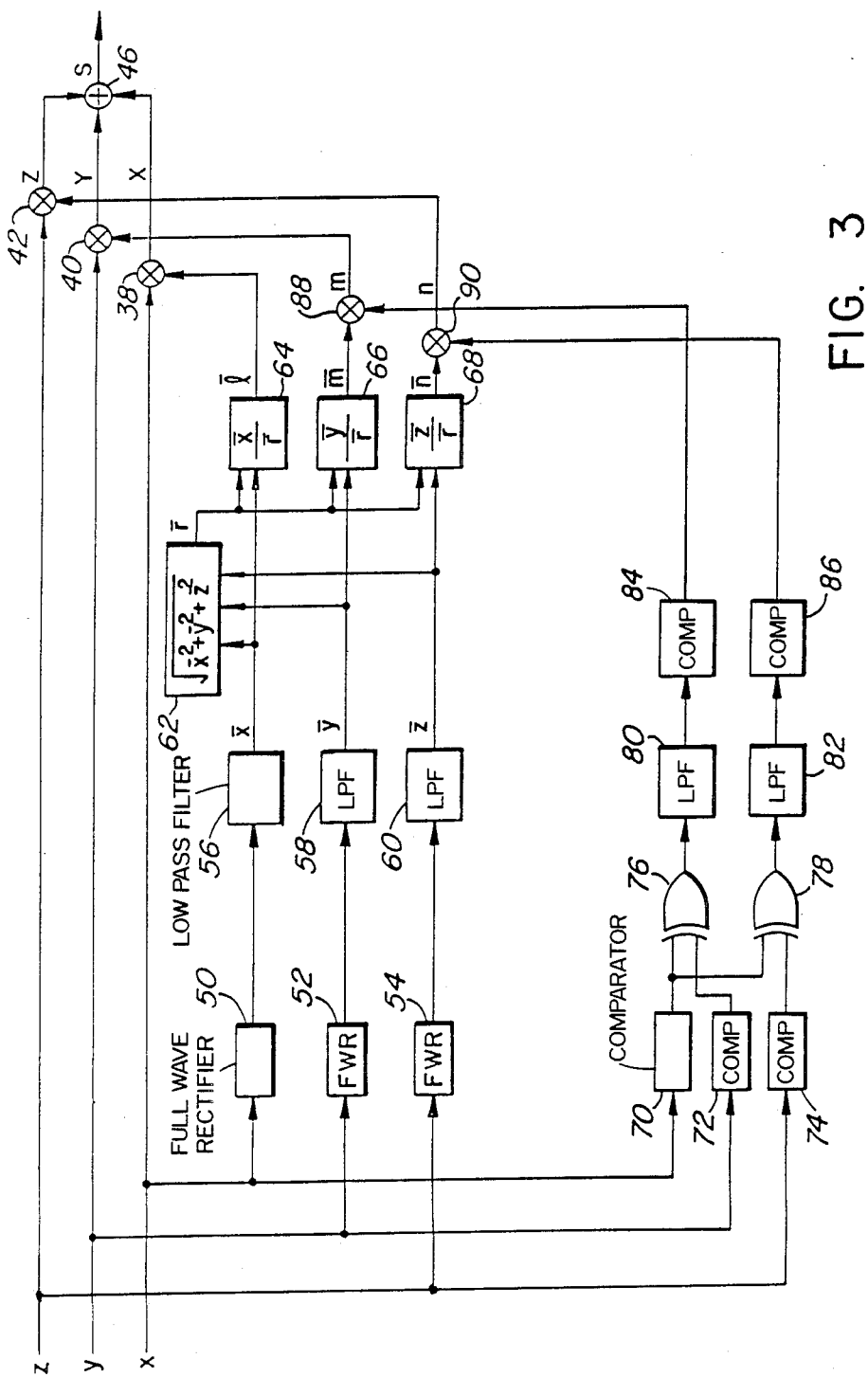
FIG. 3 is a more detailed circuit diagram of a direction estimator shown in FIG. 1.

The direction estimator is shown in more detail in FIG. 3. The signals x, y, z are each rectified by a corresponding one of three full wave rectifiers 50, 52 and 54, following which they are filtered by low pass filters 56, 58 and 60, respectively. The resulting signals $\bar{x}$, $\bar{y}$ and $\bar{z}$, which are all positive, are combined in magnitude estimation means 62 to give $$\bar{r} = \sqrt{\bar{x}^2 + \bar{y}^2 + \bar{z}^2} \; .$$

Dividers 64, 66 and 68, connected to the outputs of the low pass filters 56, 58, 60, respectively, and the magnitude estimation means 62, then compute the magnitudes of the direction cosines l, m, n as follows:

$$\bar{l} = \bar{x}/\bar{r}; \; \bar{m} = \bar{y}/\bar{r}; \; \bar{n} = \bar{z}/\bar{r}$$

The signs of the direction cosines m and n with respect to l are derived using zero-crossing comparators 70, 72 and 74 to which are applied signal x, y and z, respectively. The output of zero-crossing comparator 70, to which is applied signal x, is applied to one input of each of a pair of exclusive —OR gates 76 and 78. The other inputs of gates 76 and 78 are connected to the outputs of zero-crossing comparators 72 and 74, respectively. The outputs of gates 76 and 78 are applied to low pass filters 80 and 82, respectively, which average over about 200 milliseconds so that rapid changes of states cannot occur. The outputs of low pass filters 80 and 82 are then applied to further comparators 84 and 86, the sign outputs of which are applied to multipliers 88 and 90, respectively. These comparators, 84 and 86, compare against the mean of the maximum and minimum logic levels of the exclusive —OR gates.

Multipliers 88 and 90 multiply the magnitudes of direction cosine m and $\bar{n}$ by their signs to give the direction cosines m and n.

As mentioned previously, the original signals x, y and z are multiplied by the associated direction cosines l, m and n to give weighted signals X, Y and X respectively. The three weighted signals are then summed to produce the final outputs.

Embodiments of the invention not only provide discrimination against distant sources but also against sources located on or near to the plane at right angles to the voice source direction. At the same time, they provide complete flexibility to the user regarding handset orientation, and maintain the high-fidelity of reproduction characteristics of the modern linear microphone.

Although the specific implementation described hereinbefore uses pressure microphone transducers, the invention also comprehends the use of pressure gradient microphone transducers with suitable modification of the processing circuitry. Since pressure gradient microphone transducers are directional they would conveniently be mounted with their respective axes of sensitivity aligned with the edges of the cube. However, relative orientations other than mutually perpendicular are also viable.

Likewise, although the use of an orthogonal array and corresponding orthogonal vectors simplifies processing, the array could be non-orthogonal and the processing circuitry adapted either to produce an orthogonal set of vectors for weighting or to weight the non-orthogonal vectors themselves.

Signal processing for the microphone when the three transducers are non-orthogonal (but non-coplanar also) is adapted to provide the signal set representing orthogonal vectors "$O_i$" by linear combinations of the original transducer signals $S_1$, $S_2$ and $S_3$.

Thus, $$O_1 = \cos\theta_{11} S_1 + \cos\theta_{12} S_2 + \cos\theta_{13} S_3$$

$$O_2 = \cos\theta_{21} S_1 + \cos\theta_{22} S_2 + \cos\theta_{23} S_3$$

$$O_3 = \cos\theta_{31} S_1 + \cos\theta_{32} S_2 + \cos\theta_{33} S_3$$

or, in shorthand, $$O_i = {}_j\Sigma \cos\theta_{ij} S_j.$$

Here, $\theta_{ij}$ is the angle between orthogonal axis "i" and non-orthogonal axis "j". Where the orthogonal signal $O_i$ is associated with axis "i" and the non-orthogonal axis "j" is associated with the signal $S_j$.

It should be noted that, in the described embodiment, where the signal sensors are set in orthogonal axes, the diagonal elements of the above become unity (i.e. $\cos\theta_{11} = \cos\theta_{22} = \cos\theta_{33} = 1$) whilst all other terms become zero.

Although described with respect to telephone handset microphones, the invention could advantageously be applied to general purpose microphones, particularly for use in noisy environments, such as outside broadcasts.

What is claimed is:

1. A microphone arrangement comprising:
   an array of microphone transducers, each having an output for coupling a signal therefrom, the transducers being orthogonally spaced from each other;
   means for deriving from the outputs of said microphone transducers a signal representing the magnitude and direction of a pressure gradient of a sound field at the array;
   means responsive to said signal for weighting said outputs individually such that an axis of maximum sensitivity of the transducers is directed towards a source of maximum instant sound detected thereby.

2. A microphone arrangement as defined in claim 1, wherein said arrangement comprises three pressure gradient microphone transducers arranged such that their respective axes of maximum sensitivity are not coplanar.

3. A microphone arrangement as defined in claim 1, wherein said arrangement comprises four pressure microphone transducers arranged mutually spaced in a non-planar configuration, three spaced apart in mutually intersecting planes, the fourth positioned at the intersection of such planes.

4. A telephone set comprising a pressure gradient microphone arrangement comprising three microphone transducers each having an axis of maximum sensitivity, the three axes each extending in a respective one of three mutually intersecting orthogonal planes, means for deriving from respective outputs of said microphone transducers a signal representing the magnitude and direction of a pressure gradient of a sound field at the arrangement, and means for weighting each of said outputs of said microphone transducers, in response to said signal, so as to maximize the sensitivity of the microphone arrangement in a direction towards a source of maximum sound detected thereby.

5. A telephone set as defined in claim 4, wherein said arrangement comprises three pressure gradient microphone transducers arranged such that their respective axes of maximum sensitivity are not coplanar.

6. A telephone set as defined in claim 4, wherein said means for deriving comprises means responsive to said outputs for deriving the direction of said pressure gradient.

7. A telephone set as defined in claim 6, wherein said means for deriving said signal serves to generate a set of orthogonal vectors.

8. A telephone set as defined in claim 5, 6 or 7, comprising a handset and a base member wherein said microphone transducers are mounted in said handset.

* * * * *